(12) United States Patent
Orita

(10) Patent No.: US 10,106,166 B2
(45) Date of Patent: Oct. 23, 2018

(54) DAMPING CONTROL DEVICE FOR HYBRID VEHICLE

(71) Applicant: Nissan Motor Co., Ltd., Yokohama-shi, Kanagawa (JP)

(72) Inventor: Shuichi Orita, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/554,766

(22) PCT Filed: Mar. 20, 2015

(86) PCT No.: PCT/JP2015/058404
§ 371 (c)(1),
(2) Date: Aug. 31, 2017

(87) PCT Pub. No.: WO2016/151660
PCT Pub. Date: Sep. 29, 2016

(65) Prior Publication Data
US 2018/0237023 A1 Aug. 23, 2018

(51) Int. Cl.
*B60W 10/08* (2006.01)
*B60K 6/48* (2007.10)
(Continued)

(52) U.S. Cl.
CPC ............ *B60W 30/20* (2013.01); *B60W 10/02* (2013.01); *B60W 10/06* (2013.01); *B60W 10/08* (2013.01);
(Continued)

(58) Field of Classification Search
CPC .. B60W 30/20; B60W 50/0098; B60W 20/15; B60W 2050/0012;
(Continued)

(56) References Cited

U.S. PATENT DOCUMENTS 8,290,651 B2 * 10/2012 Park ............... B60W 30/18009
180/65.21
2010/0087996 A1 * 4/2010 Haggerty .............. B60W 50/04
701/58

(Continued)

FOREIGN PATENT DOCUMENTS

| JP | 2000-217209 A | 8/2000 |
| JP | 2001-37006 A | 2/2001 |
| JP | 2014-215904 A | 11/2014 |

*Primary Examiner* — Michael J Zanelli
(74) *Attorney, Agent, or Firm* — Global IP Counselors, LLP

(57) ABSTRACT

A damping control device for a hybrid vehicle is provided that make it possible to suppress behavior that differs from a request of a driver. The damping control device includes a controller that calculates an amount of change in a target driving torque, and calculates an amount of change in a target motor torque. The damping control device also includes a damping rate variation unit that sets the damping of a feed forward control unit to a first damping rate when the target driving torque change amount and the target motor torque change amount both are positive or negative, and to a second damping rate, which is smaller than the first damping rate, when the target driving torque change amount and the target motor torque change amount have opposite positivity or negativity.

7 Claims, 11 Drawing Sheets

(51) Int. Cl.
  B60K 6/543    (2007.10)
  B60W 20/00    (2016.01)
  B60W 30/20    (2006.01)
  B60W 10/184   (2012.01)
  B60W 20/15    (2016.01)
  B60W 30/18    (2012.01)
  B60W 50/00    (2006.01)
  B60W 10/02    (2006.01)
  B60W 10/06    (2006.01)

(52) U.S. Cl.
  CPC .......... *B60W 10/184* (2013.01); *B60W 20/15* (2016.01); *B60W 30/18127* (2013.01); *B60W 50/0098* (2013.01); *B60W 2030/203* (2013.01); *B60W 2050/0012* (2013.01); *B60W 2050/0021* (2013.01); *B60W 2510/081* (2013.01); *B60W 2510/084* (2013.01); *B60W 2520/10* (2013.01); *B60W 2540/10* (2013.01); *B60W 2710/025* (2013.01); *B60W 2710/0666* (2013.01); *B60W 2710/085* (2013.01); *B60W 2710/18* (2013.01); *Y10S 903/93* (2013.01)

(58) Field of Classification Search
  CPC ....... B60W 2030/203; B60W 2710/18; B60W 2710/0666; B60W 2510/0084; Y01S 903/93
  See application file for complete search history.

(56) References Cited

U.S. PATENT DOCUMENTS

2013/0297109 A1* 11/2013 Nefcy .................. B60W 20/00
                                              701/22
2014/0277875 A1*  9/2014 Liang .................... B60W 10/06
                                              701/22

* cited by examiner

|  |  | TARGET DRIVING TORQUE CHANGE AMOUNT | | |
|---|---|---|---|---|
|  |  | INCREASE | STABLE | DECREASE |
| TARGET MOTOR TORQUE CHANGE AMOUNT | INCREASE | FIRST DAMPING RATE (LARGE) | SECOND INTERMEDIATE VALUE | SECOND DAMPING RATE (SMALL) |
|  | STABLE | SECOND INTERMEDIATE VALUE | FIRST INTERMEDIATE VALUE | SECOND INTERMEDIATE VALUE |
|  | DECREASE | SECOND DAMPING RATE (SMALL) | SECOND INTERMEDIATE VALUE | FIRST DAMPING RATE (LARGE) |

FIG. 6

| | (A) | (B) | (C) | (D) | (E) | (F) | (G) | (H) | (I) |
|---|---|---|---|---|---|---|---|---|---|
| TARGET DRIVING TORQUE CHANGE AMOUNT | ↗ | ↗ | ↗ | → | → | → | ↘ | ↘ | ↘ |
| TARGET MOTOR TORQUE CHANGE AMOUNT | ↗ | → | ↘ | ↗ | → | ↘ | ↗ | → | ↘ |
| DAMPING RATE | ① | ③ | ② | ③ | ④ | ③ | ② | ③ | ① |

① →FIRST DAMPING RATE (1)   ② →SECOND INTERMEDIATE VALUE
③ →SECOND DAMPING RATE (0)  ④ →FIRST INTERMEDIATE VALUE

FIG. 9

DAMPING CONTROL DEVICE FOR HYBRID VEHICLE

CROSS-REFERENCE TO RELATED APPLICATIONS

This application is a U.S. National stage application of International Application No. PCT/JP2015/058404, filed Mar. 20, 2015.

BACKGROUND

Field of the Invention

The present invention relates to a damping control device for a hybrid vehicle.

Background Information

Conventionally, a hybrid vehicle comprising an engine and a motor as drive sources, provided with a vibration damping device for suppressing vibration accompanying disturbances is known (for example refer to Japanese Laid-Open Patent Application No. 2000-217209—Patent Document 1). This conventional damping control device combines a feedback control that suppresses vibration by actual disturbances, and a feed forward control that suppresses vibration due to disturbances that are assumed in advance. In addition, the feed forward control here is configured from an inverse function and a transfer function of a plant model, and attenuates predetermined vibration components.

SUMMARY

However, while suppressing a predetermined vibration component, the feed forward control also has a characteristic of dulling the response of the output torque. Consequently, a divergence between the actual driving torque and target driving torque of a vehicle occurs when increasing or decreasing the target driving torque of the vehicle. In particular, when the increase/decrease of the change rate of the target driving torque and the target motor torque are reversed, the divergence between the actual driving torque and target driving torque of a vehicle is increased. As a result, the amount of divergence between the actual driving torque and target driving torque of a vehicle is translated to a behavior that is different from the request of the driver, imparting discomfort to the driver.

In view of the problem described above, an object of the present invention is to provide a damping control device for a hybrid vehicle that is able to suppress behavior that differs from a request of a driver, which is caused by a divergence between the actual driving torque and the target driving torque of a vehicle, to thereby suppress discomfort that is imparted to the driver.

In order to achieve the object described above, the present invention is, a damping control device for a hybrid vehicle, comprising a motor torque calculating means for calculating a target motor torque, provided with a feed forward control that attenuates vibration caused by disturbances that are assumed in advance, and a feedback control that attenuates vibration caused by actual disturbances. This damping control device comprises a damping rate variation means, which sets the damping rate of the feed forward control to a first damping rate when the target driving torque change amount and the target motor torque change amount both are positive or negative, and to a second damping rate, which is smaller than the first damping rate, when the target driving torque change amount and the target motor torque change amount have opposite positivity or negativity.

In the damping control device for a hybrid vehicle according to the present invention, when the target driving torque change amount and the target motor torque change amount have opposite positivity or negativity, the damping rate is reduced to improve the responsiveness of the motor torque. In the present invention, the divergence between the actual driving torque and target driving torque of a vehicle is thereby reduced, and it is possible to suppress discomfort that is imparted to the driver.

BRIEF DESCRIPTION OF THE DRAWINGS

Referring now to the drawings, a damping control device for hybrid vehicles is illustrated.

FIG. 6 is an inverse filter damping rate map to set the damping rate of an inverse filter in the damping control device for a hybrid vehicle according to the first embodiment.

FIG. 9 is an explanatory operation diagram illustrating an example of a result of determinations by a target driving torque determination unit and a target motor torque determination unit, and a result of a setting of the damping rate by a damping rate selection unit, in the damping control device for a hybrid vehicle according to the first embodiment.

DETAILED DESCRIPTION OF THE EMBODIMENTS

Figure 1:
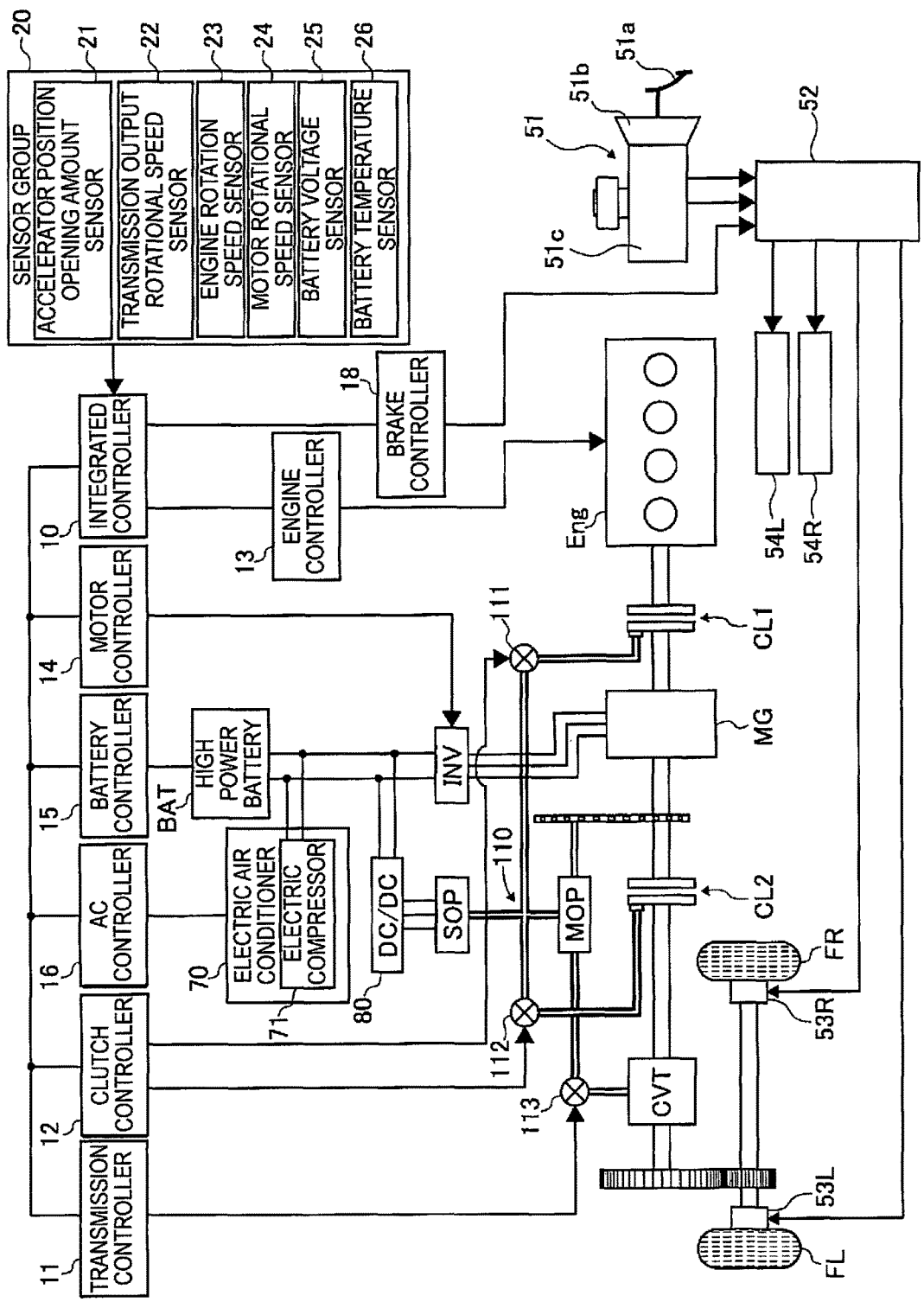
FIG. 1 is an overall schematic diagram illustrating an overall configuration of a hybrid vehicle provided with the damping control device for a hybrid vehicle according to a first embodiment.

A preferred embodiment for realizing the damping control device for a hybrid vehicle of the present invention is described below based on the embodiments illustrated in the drawings.

First Embodiment

First, the configuration of a damping control device for a hybrid vehicle of the first embodiment will be described. The damping control device for a hybrid vehicle according to the first embodiment is applied to an FF hybrid vehicle (hereinafter simply referred to as hybrid vehicle), having left and right front wheels as the drive wheels, and equipped with a belt-type continuously variable transmission.

The "overall system configuration of a hybrid vehicle", the "control system of the hybrid vehicle", (control by the integrated controller], (damping control), (variable damping rate control of the inverse filter), (setting of an optimal damping rate for gear backlash reduction), and (configuration to determine increase, stable, or decrease of the torque change amount and configuration to set the damping rate) will be separately described below, regarding the configuration of the damping control device for a hybrid vehicle according to the first embodiment.

Overall System Configuration of a Hybrid Vehicle

FIG. 1 is an overall system view of a hybrid vehicle to which is applied the damping control device of the first embodiment. The overall system configuration of the hybrid vehicle will be described below, based on FIG. 1.

A drive system of a hybrid vehicle includes an engine Eng, a first clutch CL1, a motor-generator MG (hereinafter referred to as motor MG), a second clutch CL2, and a continuously variable transmission CVT.

That is, the drive system of the hybrid vehicle is configured so that it is possible for the outputs of the engine Eng and the motor MG as drive sources to be shifted to a predetermined transmission ratio by the continuously variable transmission CVT, and transmitted to the left and right front wheels FL and FR as the drive wheels.

Additionally, in the drive system of the hybrid vehicle, a first clutch CL1 able to connect/disconnect the drive transmission is provided between the engine Eng and the motor MG, and a second clutch CL2 able to connect/disconnect the drive transmission is provided between the motor MG and the continuously variable transmission CVT. It is thereby possible to form an HEV traveling mode in which both clutches CL1 and CL2 are engaged, and traveling is carried out by the drive force of the engine Eng and the motor MG. In addition, it is possible to form an EV mode in which the first clutch CL1 is released and the second clutch CL2 is engaged, and traveling is carried out by the drive force of only the motor MG.

The engine Eng is capable of lean combustion, and the engine torque is controlled to match the command value by controlling the intake air amount by a throttle actuator, the fuel injection amount by an injector, and the ignition timing by a spark plug.

The engine Eng can be started by cranking with the motor MG, while the first clutch CL1 is slip-engaged. In addition, the configuration can be such that it is possible to start by a starter motor, which is not shown, under low-temperature conditions or high-temperature conditions, etc.

The first clutch CL1 is a frictional engagement element that is interposed between the engine Eng and the motor MG. A clutch that is able to switch between full engagement, half engagement, and disengagement by a stroke control based on a first clutch hydraulic pressure that is supplied from a hydraulic pressure control circuit 110, described later, is used as the first clutch CL1.

The motor MG has an AC synchronous motor structure that serves as a travel drive source, and carries out drive torque control and rotational speed control when starting and traveling, as well as recovering the vehicle kinetic energy generated by the regenerative braking control to the high power battery BAT when braking and decelerating. An inverter INV converts direct current to three-phase alternating current during powering and converts three-phase alternating current to direct current during regeneration is interposed between the motor MG and the high power battery BAT.

The second clutch CL2 is a frictional engagement element interposed between the motor MG, and left and right front wheels FL and FR, which are the drive wheels. The second clutch CL2 is also controlled to be in full engagement or slip engagement or disengagement by a stroke control according to a second clutch hydraulic pressure that is supplied from the hydraulic pressure control circuit 110.

The continuously variable transmission CVT is well-known and comprises, although not shown, a primary pulley, a secondary pulley, and a belt wound around both pulleys. Furthermore, the continuously variable transmission CVT is a transmission that achieves a stepless transmission ratio by changing the winding diameters of the pulleys, by a primary pressure and a secondary pressure that are supplied from the hydraulic pressure control circuit 110 to a primary oil chamber and a secondary oil chamber.

The hydraulic pressure control circuit 110 comprises, as hydraulic power sources, a main oil pump MOP (mechanical drive) and a sub oil pump SOP (motor drive). The main oil pump MOP is rotationally driven by a motor shaft of the motor MG (=transmission input shaft). In addition, the sub oil pump SOP is driven by a built-in motor, and is mainly used as an auxiliary pump for producing lubrication and cooling oil. The sub oil pump SOP is driven by power supplied from a DC/DC converter 80, described later.

The hydraulic pressure control circuit 110 comprises a first clutch solenoid valve 111, a second clutch solenoid valve 112 and a transmission control valve mechanism 113. The first clutch solenoid valve 111 and the second clutch solenoid valve 112 use a line pressure PL generated by adjusting the pump discharge pressure from the hydraulic power source as the source pressure, and respectively form a first clutch pressure and a second clutch pressure based on the stroke amount thereof.

The transmission control valve mechanism 113 comprises a solenoid valve operated by a transmission controller 11 and using line pressure PL as the source pressure to create a primary pressure and a secondary pressure according to the stroke amount thereof.

As described above, a hybrid vehicle comprises an "EV mode," an "HEV mode," and an "(HEV) WSC mode" as main driving modes, and a hybrid drive system called one-motor two-clutch is configured therein.

The "EV mode" is an electric vehicle mode having only the motor MG as the drive source by releasing the first clutch CL1 and engaging the second clutch CL2. The "HEV mode" is a hybrid vehicle mode having the engine Eng and the motor MG as drive sources, by engaging both clutches CL1 and CL2. The "WSC mode" is a CL2 slip engagement mode in which the rotational speed of the motor MG is controlled in the "HEV mode," and the second clutch CL2 is slip-engaged with an engagement torque capacity corresponding to a required driving force. The "WSC mode" is selected to absorb the rotational difference between the left and right front wheels FL and FR, and the engine Eng that is rotated at equal to, or greater than, the engine idle rotational speed, in the stopped to the starting regions, or the low-speed to the stopped regions, while in the "HEV mode" by CL2 slip engagement. The "WSC mode" is necessary because the drive system does not have a rotational difference absorption joint, such as a torque converter.

Control System of the Hybrid Vehicle

The control system of the hybrid vehicle will be described next. The control system of the hybrid vehicle comprises an inverter INV, a high power battery BAT, an integrated controller 10, a transmission controller 11, a clutch controller 12, an engine controller 13, a motor controller 14, a battery controller 15 and an AC controller 16. In the present embodiment, the control system is configured to comprise various controllers individually; however, the control system may be integrated into one controller.

The brake system of the hybrid vehicle comprises a brake operating unit 51, a brake fluid pressure control unit 52, left and right front wheel brake units 53L and 53R, and left and right rear wheel brake units 54L and 54R. In this brake system, as the motor MG carries out a regenerative operation in principle, at the time of a brake operation, a cooperative regenerative braking control is carried out with respect to the requested braking force based on a pedal operation, whereby the portion obtained by subtracting the regenerative braking force from the requested braking force is allotted to the hydraulic braking force.

The brake operating unit 51 comprises a brake pedal 51a, a negative pressure booster 51b which uses the intake negative pressure of the engine Eng, a master cylinder 51c, and the like. The brake operating unit 51 generates a predetermined master cylinder pressure according to a brake pedal stepping force from a driver that is applied to the brake pedal 51a, and is a simply configured unit that does not use an electric booster.

The brake fluid pressure control unit 52 is configured comprising, while not shown, an electric oil pump, a pressure increasing solenoid valve, a pressure decreasing solenoid valve, an oil passage switching valve, and the like. A brake controller 18 is provided to the brake fluid pressure control unit 52, with a function of generating wheel cylinder hydraulic pressure to the wheel cylinders when not operating the brake, and a function of adjusting the wheel cylinder hydraulic pressure to the wheel cylinders at the time of a brake operation. Examples of the controls that use the hydraulic pressure generation function when not operating the brake include traction control (TCS control), vehicle behavior control (VDC control), drive support control (automatic brake control), and the like. Examples of controls that use the hydraulic pressure adjustment function at the time of a brake operation include cooperative regenerative braking control, anti-lock control (ABS control), and the like. The cooperative regenerative braking control is a control that distributes the braking force of the vehicle to a braking force by hydraulic pressure that is formed in the brake fluid pressure control unit 52, and a braking force by regeneration of the motor MG during a brake operation of the brake operating unit 51.

The left and right front wheel brake units 53L and 53R are respectively provided on the left and right front wheels FL and FR, and the left and right rear wheel brake units 54L and 54R are respectively provided on the left and right rear wheels, which are not shown, and apply hydraulic braking force to each of the wheels. The brake units 53L, 53R, 54L and 54R are provided with wheel cylinders, which are not shown, to which the brake fluid pressure produced by the brake fluid pressure control unit 52 is supplied.

The power supply system of the hybrid vehicle comprises a high power battery BAT as a motor-generator power supply, and a 12V battery (not shown) as a 12V load power supply.

The inverter INV carries out DC/AC conversion, and generates a drive current for the motor MG. The inverter also reverses the output rotation of the motor MG, by reversing the phase of the generated drive current. The high power battery BAT is a secondary battery that is mounted as a power source of the motor MG, and, for example, a lithium ion battery, in which a cell module configured with numerous cells is set inside a battery pack case, is used therefor. In the present embodiment, the high power battery is not limited to a lithium ion battery, and may be a power storage means, such as a nickel hydrogen battery.

The inverter INV converts DC power from the high power battery BAT to three-phase alternating current and supplies the same to the motor MG, at the time of powering, in which the motor MG is driven by the discharge of the high power battery BAT, by a powering/regeneration control by the motor controller 14. In addition, the inverter converts the three-phase AC power from the motor MG to DC power, at the time of regeneration for charging the high power battery BAT, by the power generation by the motor MG.

The integrated controller 10 is configured from an electronic control unit (ECU) provided with a microcomputer, and calculates a target drive torque and the like, from the remaining battery capacity (battery SOC); the accelerator position opening amount APO; the vehicle speed VSP, and the like. Then, based on the calculation result, the integrated controller 10 calculates command values for each of the actuators (motor MG, engine Eng, first clutch CL1, second clutch CL2, and the continuously variable transmission CVT), which are transmitted to the respective controllers 11 to 15.

The battery SOC is input from the battery controller 15. The accelerator position opening amount APO is detected by an accelerator position opening amount sensor 21. The vehicle speed VSP is a value that is synchronized with the transmission output rotational speed, and is detected by a transmission output rotational speed sensor 22. In addition, the integrated controller 10 controls the discharge flow rate of the main oil pump MOP, the discharge flow rate of the sub oil pump SOP, and the line pressure PL.

The transmission controller 11 performs a shift control so as to achieve a gear shift command from the integrated controller 10. The shift control is carried out by controlling the hydraulic pressure supplied to the primary pulley and the hydraulic pressure supplied to the secondary pulley of the continuously variable transmission CVT, based on the control of the transmission control valve mechanism 113, using the line pressure PL supplied via the hydraulic pressure control circuit 110 as the source pressure. Then, the surplus pressure generated when creating the hydraulic pressure supplied to the primary pulley and the hydraulic pressure supplied to the secondary pulley from the line pressure PL, is passed onto cooling and lubricating the first clutch CL1 and the second clutch CL2.

The clutch controller 12 receives input and output rotational speeds, the clutch oil temperature, etc., of the clutch, and carries out a first clutch control and a second clutch control, so as to achieve a first clutch control command and a second clutch control command from the integrated controller 10.

This first clutch control is carried out by controlling the hydraulic pressure supplied to the first clutch CL1 based on the control of the first clutch solenoid valve 111, using the line pressure PL supplied via the hydraulic pressure control circuit 110 as the source pressure.

In addition, the second clutch control is carried out by controlling the hydraulic pressure supplied to the second clutch CL2 based on the control of the second clutch solenoid valve 112, using the line pressure PL supplied via the hydraulic pressure control circuit 110 as the source pressure.

Then, the surplus pressure generated when creating the hydraulic pressure supplied to the first clutch CL1 and the hydraulic pressure supplied to the second clutch CL2 from the line pressure PL, is passed onto cooling and lubricating the first clutch CL1 and the second clutch CL2.

The engine controller 13 inputs the engine rotational speed detected by the engine rotation speed sensor 23, target engine torque commands from the integrated controller 10, and the like. Then, the engine controller 13 carries out start control, fuel injection control, ignition control, fuel cut control, and the like, in order to control the engine torque so as to achieve the target engine torque command value.

The motor controller 14 inputs target motor torque command values and motor rotational speed command values from the integrated controller 10, the motor rotational speed detected by the motor rotational speed sensor 24, and the like. Then, the motor controller 14 carries out controls, such as the powering control and the regenerative control, motor creep control, and motor idle control of the motor MG, so as to achieve the target motor torque command value and the motor rotational speed command value.

The battery controller 15 manages the battery temperature, the battery SOC, which is the remaining capacity of the high power battery BAT, and the like, based on the input information from a battery voltage sensor 25, a battery temperature sensor 26, and the like, and transmits the information to the integrated controller 10.

The AC controller 16 controls the operation of an electric air conditioner 70, based on the detection of a sensor (not shown) that detects various environmental factors relating to the cabin temperature. The electric air conditioner 70 is operated by a power supply from the high power battery BAT to adjust the temperature inside the vehicle, and an electric compressor 71 compresses a refrigerant is provided to the electric air conditioner 70. The electric compressor 71 incorporates an inverter (not shown), converts DC power supplied from the high power battery BAT to AC power, and is driven by a motor (not shown). A DC/DC converter 80 is connected to the high power battery BAT in parallel with the electric air conditioner 70. The DC/DC converter 80 supplies DC power to on-board electric devices, such as the sub oil pump SOP, after transforming the voltage of the high power battery BAT.

Control by the Integrated Controller

Figure 2:
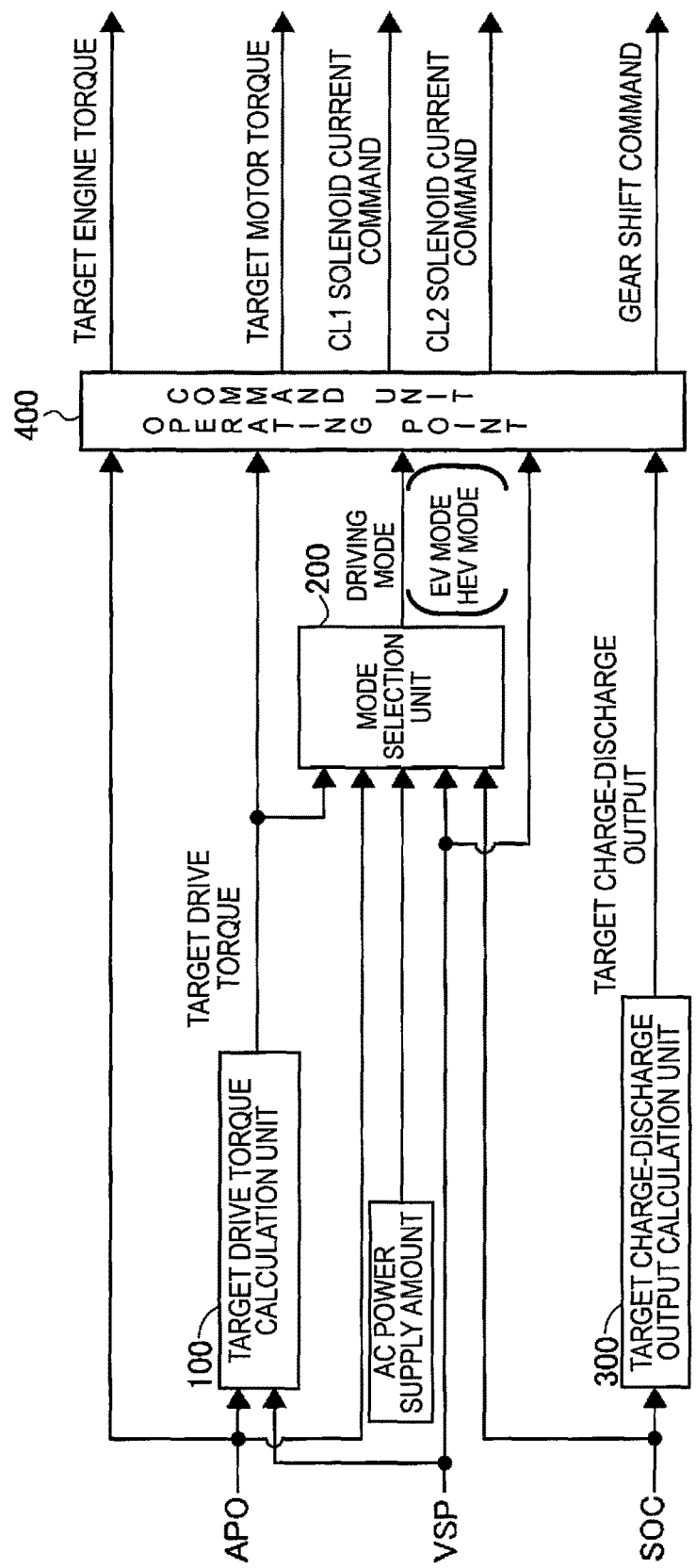
FIG. 2 is a block diagram illustrating a configuration of an integrated controller of the damping control device for a hybrid vehicle according to the first embodiment.

Control by the integrated controller 10 will be briefly described next. The integrated controller 10 comprises a target drive torque calculation unit 100, a mode selection unit 200, a target charge-discharge output calculation unit 300, and an operating point command unit 400, as illustrated in FIG. 2.

In the target drive torque calculation unit 100, the accelerator position opening amount APO, the transmission input rotational speed Nin, etc., are input, and a target drive torque tTd (target vehicle total torque) is calculated from a target stationary torque map (one example of an engine torque map), and an assist torque map (one example of a motor-generator torque map).

The mode selection unit 200 calculates which driving mode to be the target driving mode, that is, the HEV mode or the EV mode. The setting of the driving mode by the mode selection unit 200 can be, for example, selecting between the EV mode and the HEV mode according to the vehicle speed VSP and the accelerator position opening amount APO based on a mode selection map that is set in advance; however, the details are omitted.

The target charge-discharge output calculation unit 300 increases the power generation amount when the battery SOC is low, reduces the power generation amount when the battery SOC is high, and calculates the target charge-discharge power tP so as to increase the motor assistance.

The operating point command unit 400 calculates the operating point arrival targets from the accelerator position opening amount APO, the target drive torque, the driving mode, the vehicle speed VSP, and the target charge-discharge power, which are output as command values. A target engine torque, a target motor torque, a target CL2 torque capacity, a target transmission ratio, a first clutch solenoid current command, and a second clutch solenoid current command, are calculated as these operating point arrival targets. In the present embodiment, the operating point command unit 400 integrally calculates the target engine torque, the target motor torque, the target CL2 torque capacity, the target transmission ratio, the first clutch solenoid current command, and the second clutch solenoid current command; however, a means to calculate the command values can be provided for each.

Damping Control

Figure 3:
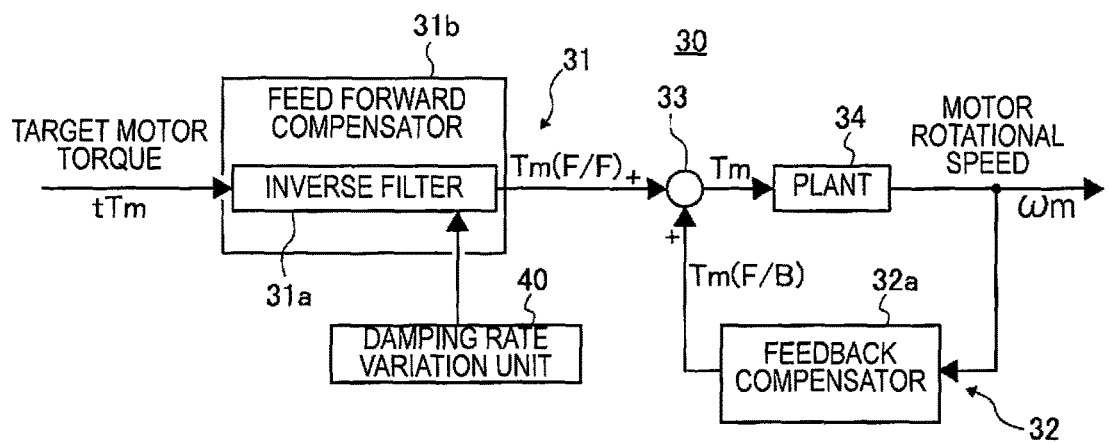
FIG. 3 is a block diagram illustrating a motor torque calculation unit in the damping control device for a hybrid vehicle according to the first embodiment.

The integrated controller 10 comprises a motor torque calculation unit 30, illustrated in FIG. 3, which corrects a motor torque command that is applied to the motor MG (target motor torque (tTm)) so as to further suppress the vehicle vibration, and outputs the same as the final target motor torque. The motor torque calculation unit 30 comprises a feed forward control unit 31 and a feedback control unit 32.

The feed forward control unit 31 attenuates vibrations caused by a disturbance that is assumed in advance, and comprises a feed forward compensator 31b that attenuates the target motor torque (tTm), which is the motor torque command, by an inverse filter 31a, and outputs the same to an adder 33. In the first embodiment, the damping rate of the inverse filter 31a is variably set by a damping rate variation unit 40, which will be described in detail later.

The feedback control unit 32 attenuates a predetermined vibration caused by an actual disturbance, and attenuates a predetermined vibration component of a motor rotational speed corn, which is output from a plant 34 (drive system of a vehicle), with a feedback compensator 32a by a predetermined feedback gain and outputs the same to the adder 33.

Variable Damping Rate Control of the Inverse Filter

Figure 4:
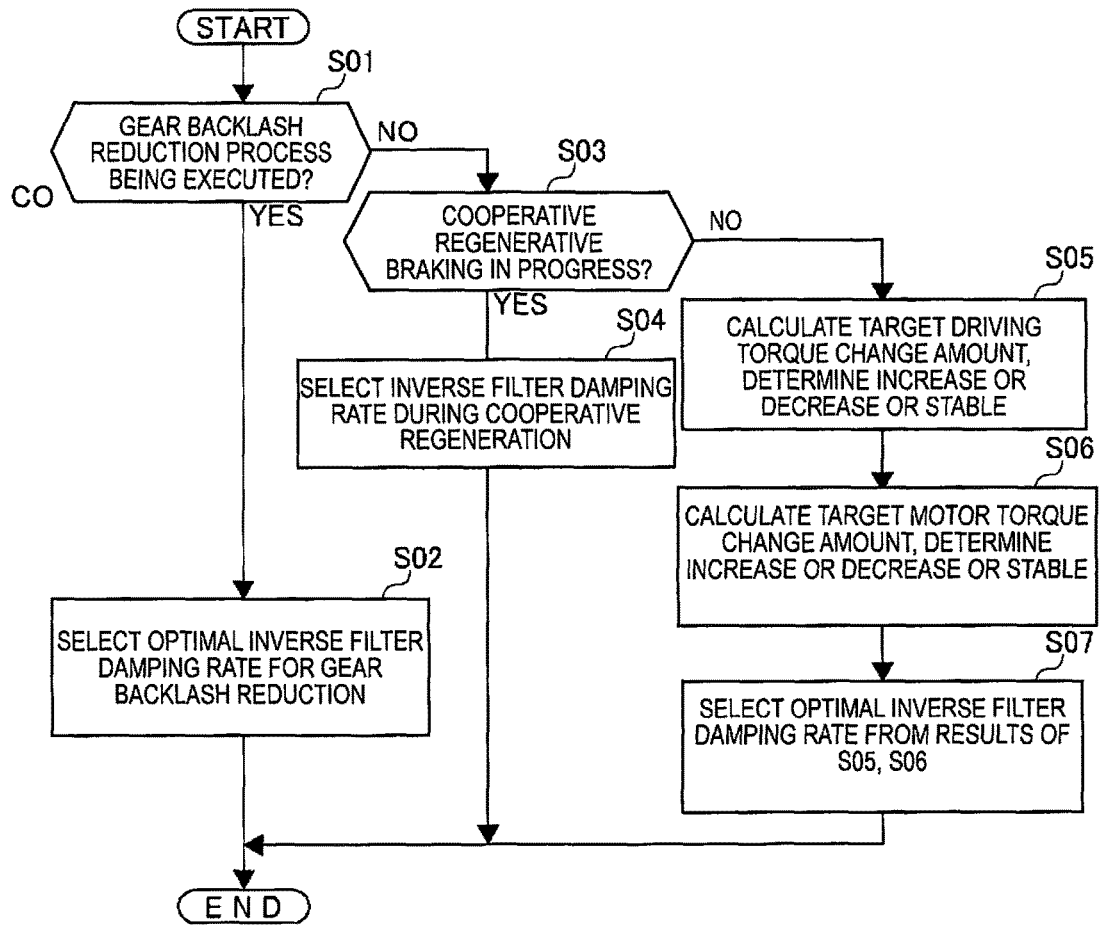
FIG. 4 is a flowchart illustrating the process of a variable damping rate control in the damping rate variation unit of the damping control device for a hybrid vehicle according to the first embodiment.

Next, the variable damping rate control in the damping rate variation unit 40 will be described based on the flowchart of FIG. 4. This variable damping rate control is a control for varying the damping rate of the inverse filter 31a in a range from a first damping rate to a second damping rate, based on whether or not a gear backlash reduction process is in progress; whether or not a cooperative regenerative braking control is in progress; the target driving torque change amount; and the target motor torque change amount.

In Step S01, it is determined whether or not a gear backlash reduction process is being executed; if the gear backlash reduction process is being executed, the process proceeds to Step S02, and otherwise the process proceeds to Step S03. The gear backlash reduction process is a process for limiting the target motor torque, when the target driving torque switches from positive to negative, or from negative to positive, in order to suppress a generation of shock due to the rotational acceleration of the gear backlash component, of the drive transmission system including a continuously variable transmission CVT. In addition, the time when a backlash reduction process is being executed, includes during the backlash reduction process, as well as a predetermined time before the start of execution.

In Step S02, to which the process proceeds when executing the gear backlash reduction process, the damping rate of the inverse filter 31a is set to a damping rate that is optimal for gear backlash reduction. This optimal damping rate is gradually (in three stages in the present embodiment) reduced from a first damping rate that is initially set as the damping rate toward the start time of a gear backlash reduction process, and the damping rate is set to "0" during the gear backlash reduction process. The details will be described later.

In Step S03, to which the process proceeds when the gear backlash reduction process is not being executed in Step S01, it is determines whether or not cooperative regenerative braking is in progress; if cooperative regenerative braking is in progress, the process proceeds to Step S04, and if cooperative regenerative braking is not in progress, the process proceeds to Step S05.

In Step S04, to which the process proceeds during cooperative regenerative braking, the damping rate of the inverse filter 31a is set to a damping rate for cooperative regenerative braking, and the above-described first damping rate is used in the first embodiment. Here, the damping rate in the case of cooperative regenerative braking is set to be larger than the damping rate when cooperative regenerative braking is not in progress. This is because, when cooperative regenerative braking is in progress, there is a high probability that vibration will occur in the vehicle; therefore, by setting the damping rate large in a traveling area in which such vibration can easily occur, it is possible to effectively suppress the vehicle vibration.

In Step S05, to which the process proceeds when cooperative regenerative braking is not in progress in Step S03, a target driving torque change amount is calculated, and an increased, decreased, or a stable target driving torque is determined. Furthermore, in Step S06 to which the process proceeds after the process of Step S05, the target motor torque change amount is calculated, and an increased, decreased, or a stable target motor torque is determined.

Figure 5:
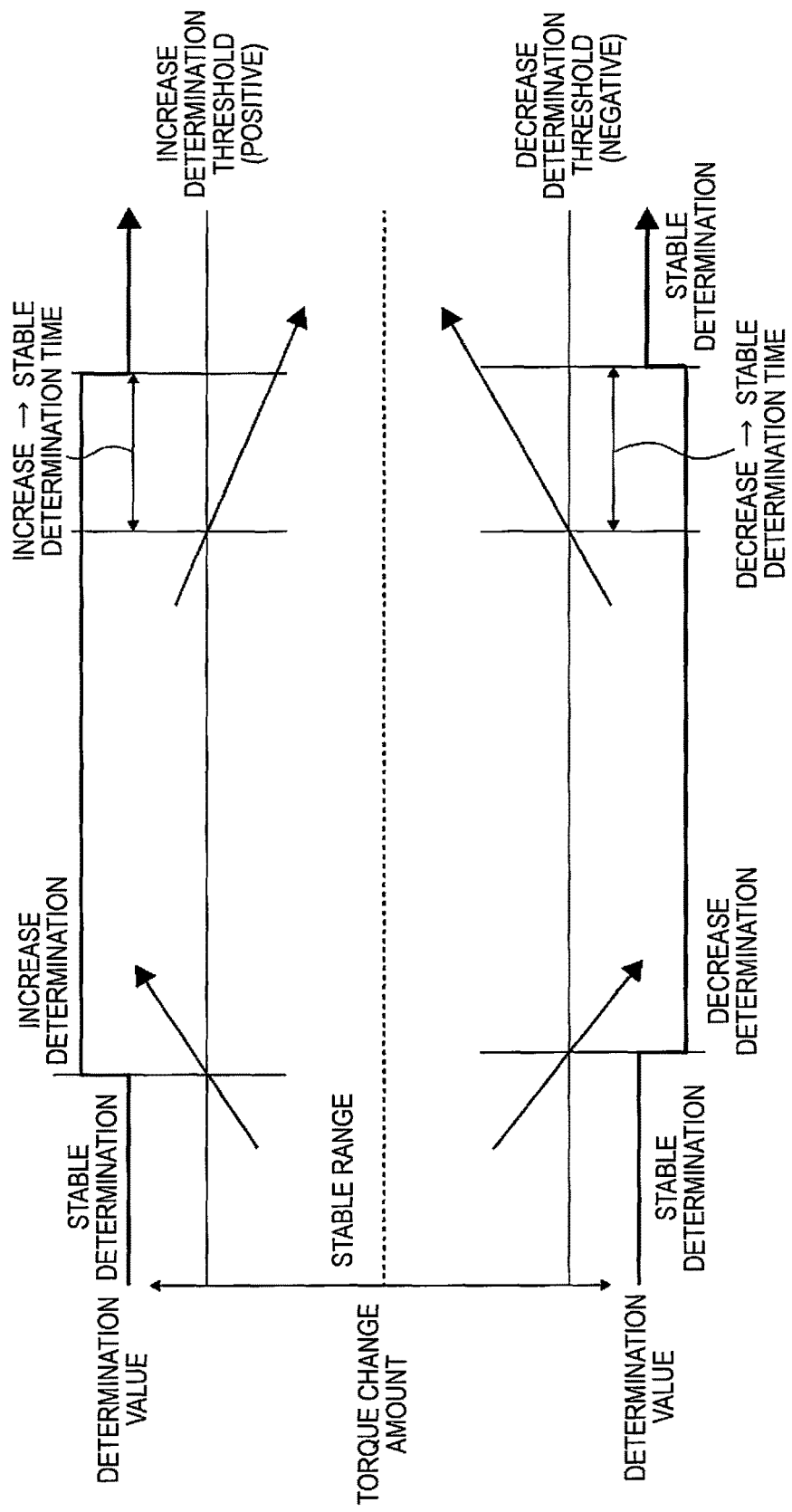
FIG. 5 is an explanatory view of a process to determine an increasing, decreasing, and a stable target driving torque and target motor torque in the damping control device for a hybrid vehicle according to the first embodiment.

Here, increased, decreased, or stable target driving torque and the target motor torque are respectively determined based on an increase determination threshold and a decrease determination threshold, illustrated in FIG. 5. That is, it is determined to be increasing when the torque change amount becomes equal to, or greater than, the increase determination threshold (a positive value, corresponding to a first driving torque change amount and a first motor torque change amount). On the other hand, it is determined to be decreasing, when the torque change amount becomes less than the decrease determination threshold (a negative value, corresponding to a second driving torque change amount and a second motor torque change amount).

Additionally, a stable determination is made when the torque change amount is within a stable range, which less than the increase determination threshold and equal to, or greater than, the decrease determination threshold. Furthermore, in this stable determination of the first embodiment, in order to prevent chatter, it is determined to be stable after a predetermined stable determination time has elapsed after the torque change amount has changed from outside of the stable range to within the stable range. Additionally, the increase→stable determination time, used when the torque change amount transitions from increase to within the stable range, and the decrease→stable determination time, used when the torque change amount transitions from decrease to within the stable range, are independently set.

In the stable determination, it may be considered stable when transitioning to the stable range, or an increase→stable determination time and a decrease→stable determination time may be provided, as described above. Additionally, it is described above to independently set the increase→stable determination time and the decrease→stable determination time, but the present embodiment is not limited thereto, and the increase→stable determination time and the decrease→stable determination time may be integrally set.

FIG. 5 shows the determination criteria in the determination process of increasing, decreasing, or stable target driving torque and the target motor torque; the increase determination threshold and the decrease determination threshold, which become the criteria of determination, and the torque change amount that is compared therewith, are shown as one value.

However, different values may be used as the increase determination threshold of the drive torque change amount (first driving torque change amount) and the increase determination threshold of the motor torque change amount (first motor torque change amount). Similarly, different values may be used as the decrease determination threshold of the drive torque change amount (second driving torque change amount) and the decrease determination threshold of the motor torque change amount (second motor torque change amount).

In Step S07, to which the process proceeds after determining increasing, decreasing, or stable target driving torque and the target motor torque by Steps S05 and S06, as described above, the damping rate is calculated based on the determination result thereof, and the inverse filter damping rate map illustrated in FIG. 6. While the details of the inverse filter damping rate map will be described later, the point is that the damping rate is set to a first damping rate (large) when the target driving torque change amount and the target motor torque change amount both are positive or negative, and the first damping rate is set to, for example, one. On the other hand, the damping rate is set to a second damping rate (small), which is smaller than the first damping rate, when the target driving torque change amount and the target motor torque change amount have opposite positivity or negativity. In the description of FIG. 5, the first damping rate, for example, is set to one, but no limitation is imposed thereby, and the first damping rate may be any value larger than the second damping rate. The second damping rate is set to "0", but no limitation is imposed thereby, and the second damping rate may be any value smaller than the first damping rate.

Figure 8:
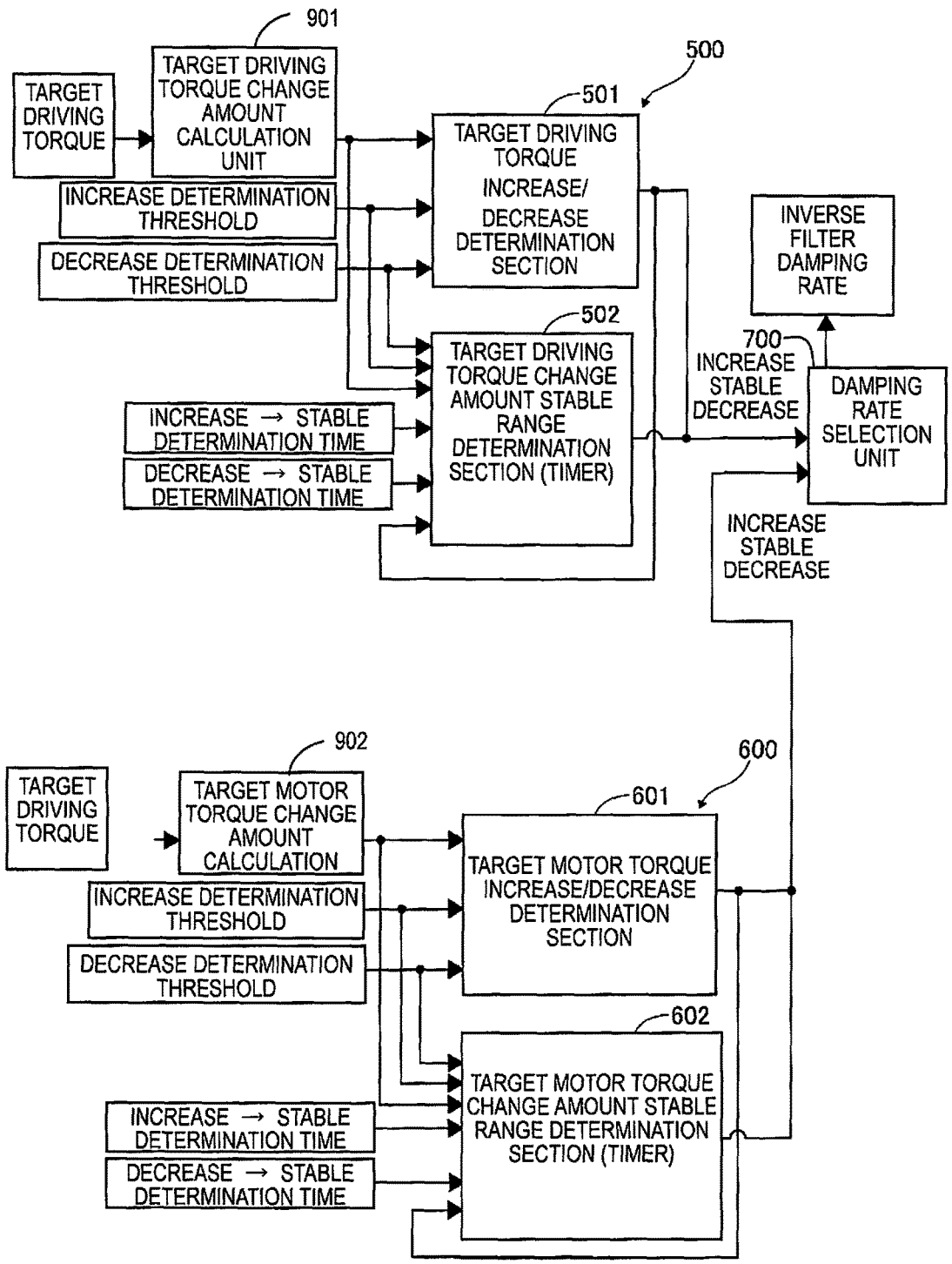
FIG. 8 is a block diagram illustrating a determination unit that determines increasing, decreasing, and a stable target driving torque and target motor torque, and a damping rate setting unit that sets the damping rate of the inverse filter, in the damping control device for a hybrid vehicle according to the first embodiment.

Configuration to Determine Increase, Stable, Decrease of the Torque Change Amount and Configuration to Set the Damping Rate Next, the target driving torque determination unit 500, the target motor torque determination unit 600, and the damping rate selection unit 700 will be described, based on FIG. 8. The target driving torque determination unit 500 determines an increasing, stable, or a decreasing target driving torque change amount of Step S05 in FIG. 4. The target motor torque determination unit 600 determines the increasing, stable, or decreasing target motor torque change amount of Step S6 in FIG. 4. The damping rate selection unit 700 sets the damping rate of S07 in FIG. 4.

A target driving torque increase/decrease determination section 501 of the target driving torque determination unit 500 inputs the amount of change from the previous value of the target driving torque as the time-differential of the target motor torque, from the target driving torque change amount calculation unit 901. Then, it is determined to be increasing when the target driving torque change amount is equal to or greater than the positive value increase determination threshold, which is set in advance, and it is determined to be decreasing when less than the negative value decrease determination threshold, which is set in advance. In addition, a target motor torque increase/decrease determination section 601 of the target motor torque determination unit 600 also inputs the amount of change from the previous value of the target motor torque as the target motor torque change amount, which is the time-differential of the target motor torque, from the target motor torque change amount calculation unit 902. Then, it is determined to be decreasing when the target motor torque change amount is equal to, or greater than, the positive value increase determination threshold, which is set in advance, and it is determined to be decreasing when less than the negative value decrease determination threshold, which is set in advance.

Additionally, a target driving torque change amount stable range determination section 502 of the target driving torque determination unit 500, inputs the target driving torque change amount, the increase determination threshold, the decrease determination threshold, and the determination result of the increase or decrease of the target driving torque increase/decrease determination section 501. Then, it is determined to be stable when the target driving torque change amount transitions from equal to or greater than the increase determination threshold, to within a torque change amount stable range, which is less than the increase determination threshold and equal to or greater than the decrease determination threshold, and the elapsed time from the transition exceeds the increase→stable determination time. Similarly, it is determined to be stable when the target driving torque change amount transitions from less than the decrease determination threshold, to within a torque change amount stable range, which is less than the increase determination threshold and equal to or greater than the decrease determination threshold, and the elapsed time from the transition exceeds the decrease→stable determination time. In addition, a target motor torque change amount stable range determination section 602 of the target motor torque determination unit 600 also carries out the same determination as the above with respect to the target motor torque, using the increase determination threshold, the decrease determination threshold, the increase→stable determination time, and the decrease→stable determination time.

The damping rate selection unit 700 selects the damping rate, based on the determination result of increase, stable, or decrease of the target driving torque change amount, as well as on the inverse filter damping rate map of FIG. 6 described above, according to the determination result of increase, stable, or decrease of the target motor torque change amount.

Inverse Filter Damping Rate Map

Next, the inverse filter damping rate map of FIG. 6 will be described. As illustrated in the figure, when the target driving torque change amount is increasing (equal to or greater than the increase determination threshold) and the target motor torque change amount is decreasing (less than the decrease determination threshold), the damping rate of the inverse filter 31*a* is set to the second damping rate (small), which is smaller than the first damping rate (large), and the second damping rate is set to, for example, "0."

In addition, when the target driving torque change amount is decreasing (less than the decrease determination threshold) and the target motor torque change amount is increasing (equal to or greater than the increase determination threshold), the damping rate of the inverse filter 31*a* is set to the second damping rate, which is smaller than the first damping rate, and this second damping rate is set to, for example, "0."

Additionally, when the target driving torque change amount is stable (less than the increase determination threshold and equal to or greater than the decrease determination threshold) and the target motor torque change amount is other than stable (outside of the stable range), the damping rate is set to a second intermediate damping rate between the first damping rate (large) and the second damping rate (small), and this second intermediate damping rate is set to, for example, 0.3.

In a case in which the target driving torque change amount is other than stable (outside of the stable range) and the target motor torque change amount is stable (less than the increase determination threshold and equal to or greater than the decrease determination threshold), the damping rate is also set to a second intermediate damping rate between the first damping rate (large) and the second damping rate (small).

When the target driving torque change amount and the target motor torque change amount are each stable (less than the increase determination threshold and equal to or greater than the decrease determination threshold), the damping rate is set to a first intermediate damping rate between the first damping rate (large) and the second intermediate damping rate, and this first intermediate damping rate is set to, for example, 0.6. Additionally, when the target driving torque change amount and the target motor torque change amount have the same positivity or negativity, and both are increasing (equal to or greater than the increase determination threshold), or both are decreasing (less than the decrease determination threshold), the damping rate is set to the first damping rate (large). In this case, in the first embodiment, the first damping rate is set to, for example, "1."

Actions of the First Embodiment

Next, the action of the first embodiment will be described. First, the determination results of the target driving torque determination unit 500 and the target motor torque determination unit 600, which carry out the process of Steps S05-S07, and an example of a result of setting the damping rate by the damping rate selection unit 700, will be briefly described with reference to FIG. 9.

FIG. 9 illustrates the relationship between the combination of the increase/decrease of the torque change amounts of the target driving torque and the target motor torque, and the corresponding damping rate. In the figure, the upward arrows indicate increasing torque change amounts, the lateral arrows indicate stable torque change amounts, and the downward arrows indicate decreasing torque change amounts.

As shown in (A) of this FIG. 9, when both the target driving torque and the target motor torque are increasing and positive, the damping rate of the inverse filter 31a is set to the first damping rate (1). As shown in (B) of the FIG. 9, when the target driving torque is increasing and the target motor torque is stable, the damping rate of the inverse filter 31a is set to the second intermediate value. As shown in (C) of the FIG. 9, when the target driving torque is increasing and the target motor torque is decreasing, the damping rate of the inverse filter 31a is set to the second damping rate (0).

In addition, as shown in (D) of the FIG. 9, when the target driving torque is stable and the target motor torque is increasing, the damping rate of the inverse filter 31a is set to the second intermediate value. As shown in (E) of the FIG. 9, when the target driving torque is stable and the target motor torque is stable, the damping rate of the inverse filter 31a is set to the first intermediate rate. As shown in (F) of the figure, when the target driving torque is stable and the target motor torque is decreasing, the damping rate of the inverse filter 31a is set to the second damping rate (0).

Additionally, as shown in (G) of the FIG. 9, when the target driving torque is decreasing and the target motor torque is increasing, the damping rate of the inverse filter 31a is set to the second damping rate (0). As shown in (H) of the FIG. 9, when the target driving torque is decreasing and the target motor torque is stable, the damping rate of the inverse filter 31a is set to the second intermediate value. As shown in (I) of the FIG. 9, when both the target driving torque and the target motor torque are decreasing and negative, the damping rate of the inverse filter 31a is set to the first damping rate (1).

Next, specific operation examples of setting the damping rate of the inverse filter 31a according to the target driving torque change amount and the target motor torque change amount, based on the process of Steps S05-S07 as described above, will be described with reference to FIG. 10.

Figure 10:
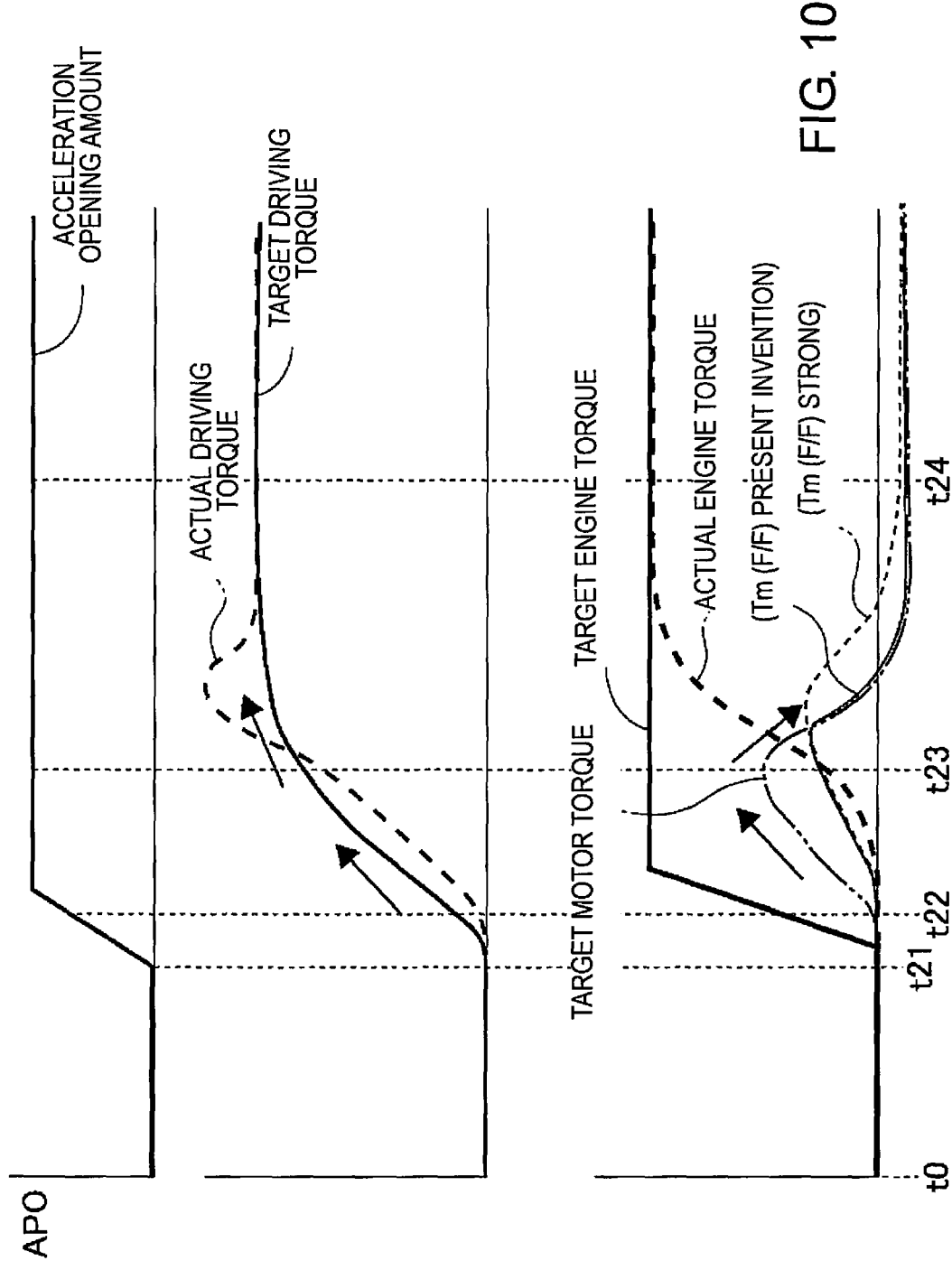
FIG. 10 is a time chart illustrating an operation example when the damping rate of the inverse filter is set according to the target driving torque change amount and the target motor torque change amount in the damping control device for a hybrid vehicle according to the first embodiment.

That is, when the driver carries out an acceleration operation by depressing the accelerator pedal, which is not shown, from time t21, and the accelerator position opening amount APO changes as illustrated in the FIG. 10, the target driving torque is increased. In addition, at this time, the target engine torque rises as indicated by the solid line, in response to the accelerator pedal operation. Then, the target motor torque, obtained by subtracting the target engine torque from the target driving torque, rises from time t21, and falls from time t23, as illustrated by the chain double-dashed line. Furthermore, with respect to this target motor torque, the feed forward compensator 31 outputs a value attenuated by the inverse filter 31a (Tm (F/F)).

In the present embodiment, the damping rate of the inverse filter 31a is variably set according to the target driving torque change amount and the target motor torque change amount. That is, in the case of the operation example of FIG. 10, from time t21 to time t23, the target driving torque change amount is increasing and the target motor torque change amount is increasing; therefore, since the change amounts of the two are both positive, the damping rate is set to the first damping rate. Therefore, the output value (Tm (F/F)) of the feed forward compensator 31b becomes the same value as the comparative example.

In contrast, from time t23 to time t24, since the target driving torque change amount is increasing and the target motor torque change amount is decreasing; therefore, the damping rate is set to the second damping rate. Therefore, the output value (Tm (F/F)) of the feed forward compensator 31b matches the target motor torque.

Therefore, it is possible to alleviate the response delay of the actual motor torque after time t23, and to suppress the actual driving torque with respect to the target driving torque from standing out, as illustrated by the dotted line in the FIG. 10. Therefore, the divergence between the actual driving torque and target driving torque of the vehicle is reduced, and it is possible to reduce discomfort imparted to the driver.

Setting of an Optimal Damping Rate for Gear Backlash Reduction

Next, the configuration to set the optimal damping rate for gear backlash reduction, which is set in Step S02, will be described.

Figure 11:
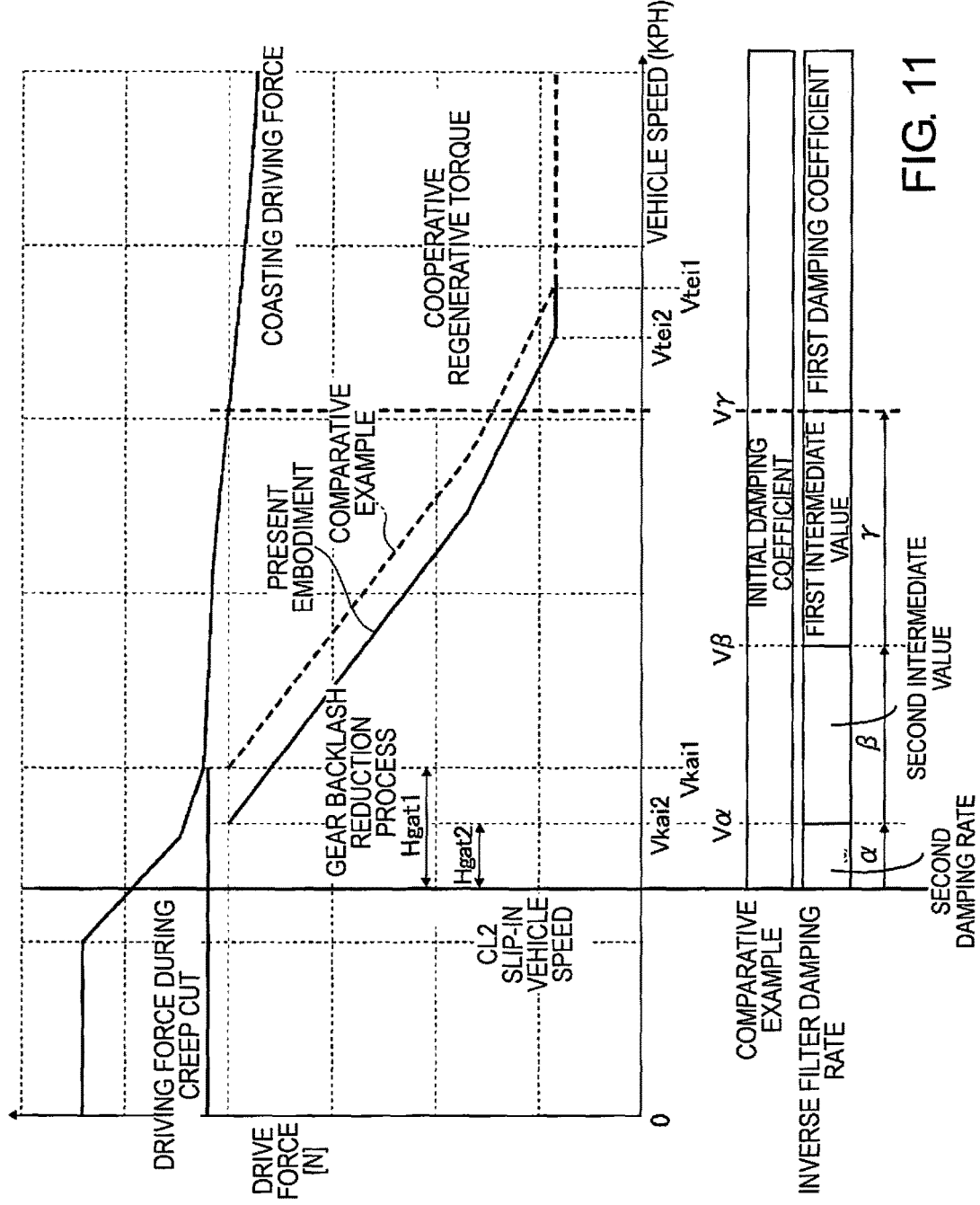
FIG. 11 is a damping rate characteristic diagram illustrating the relationship between the vehicle speed and the damping rate at the time of cooperative regenerative braking and a gear backlash reduction process in the damping control device for a hybrid vehicle according to the first embodiment.

At the time of the gear backlash reduction, in the first embodiment, the damping rate is reduced from the first damping rate in three stages, as illustrated in FIG. 11. The three stages of change are set based on a CL2 slip-in vehicle speed Vin, which is the vehicle speed at which the slipping of the second clutch CL2 is started, and the vehicle speed differences $\alpha$, $\beta$, $\gamma$ from this CL2 slip-in vehicle speed Vin.

That is, when the vehicle speed VSP is in a region from Vin+$\gamma$ to Vin+$\beta$, the first intermediate value is used as the damping rate, and the damping rate is set to a value smaller than the first damping rate. When the vehicle speed VSP is in a region from Vin+$\beta$ to Vin+$\alpha$, the second intermediate value is used as the damping rate, and the damping rate is set to a value smaller than the first intermediate value and the first damping rate. Furthermore, when the vehicle speed VSP is in a region from Vin+$\alpha$ to Vin, and while the gear backlash reduction process is in progress, the damping rate is set to the second damping rate.

Figure 7:
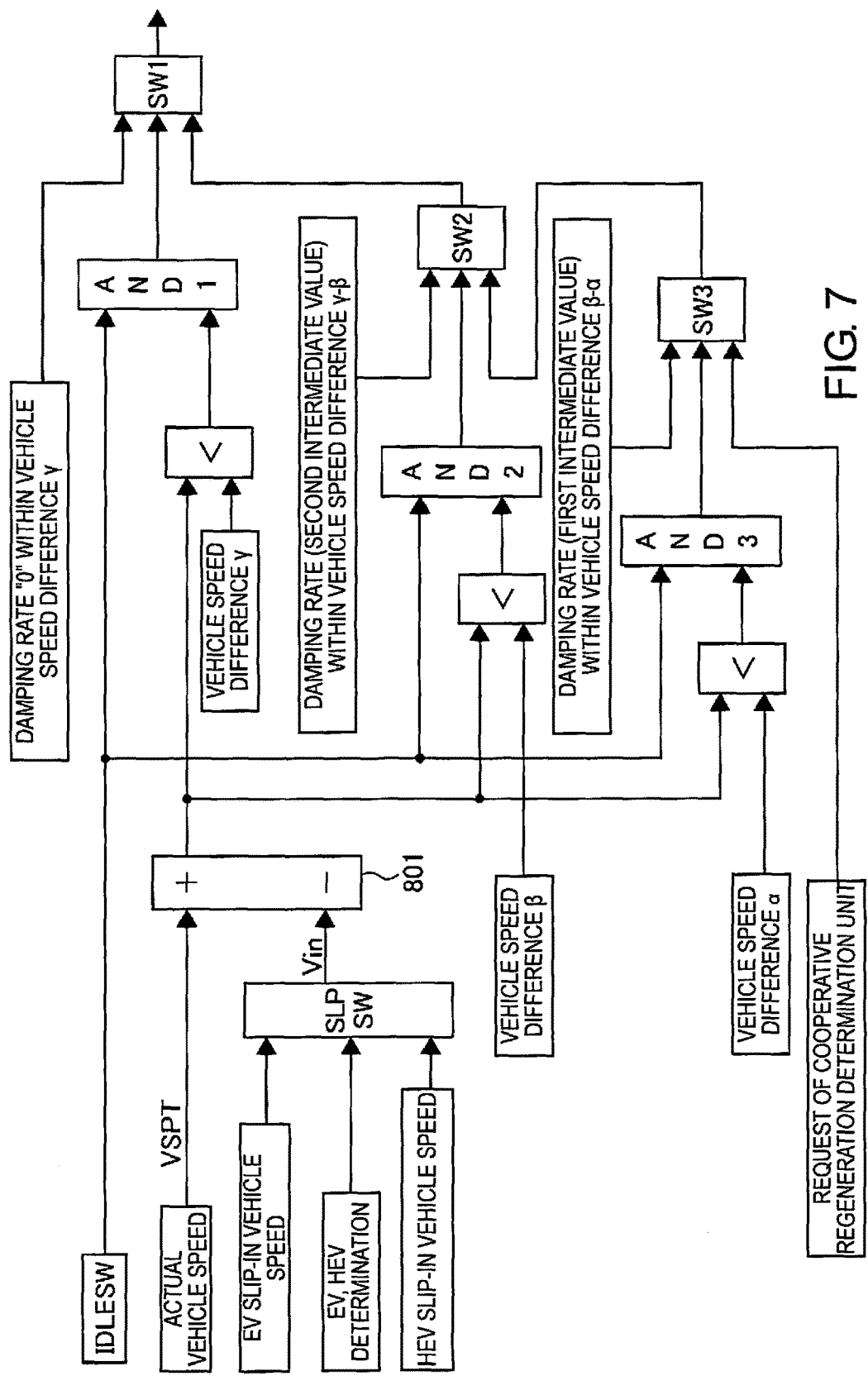
FIG. 7 is a block diagram illustrating a configuration for setting the damping rate in the damping control device at the time of gear backlash reduction for a hybrid vehicle according to the first embodiment.

The configuration to set the damping rate at the time of gear backlash reduction as described above is described below, based on the block diagram of FIG. 7. This configuration is a configuration for executing gear backlash reduction when slipping the second clutch CL2 when the vehicle speed VSP is reduced, by switching the motor MG from regeneration to powering, so that the engine rotational speed does not fall below the idling rotational speed. The decrease in the vehicle speed VSP described above occurs during a braking operation, or during coasting travel (coasting), in which the driver's foot is released from the accelerator pedal, which is not shown.

The configuration for setting the damping rate at the time of the gear backlash reduction comprises a first switch SW1, a second switch SW2, and a third switch SW3. When the vehicle speed VSP becomes a value obtained by adding the first vehicle speed difference $\gamma$ to the CL2 slip-in vehicle speed Vin, the first switch SW1 outputs a preset damping rate "0." That is, a first AND circuit AND1 satisfies the AND condition and is turned ON, when an idle switch, which turns ON when the accelerator position opening amount APO is 0, is turned ON, and a value obtained by subtracting the CL2 slip-in vehicle speed Vin from the actual vehicle speed VSPT becomes less than the first vehicle speed difference γ. Then, the first switch SW1 outputs a damping rate "0" when the first AND circuit AND1 is turned ON. When the first AND circuit AND1 is turned OFF, and there is an input of either the second intermediate value or the first intermediate value from the second switch SW2 and the third switch SW3, the first switch SW1 outputs each of the intermediate values.

When the vehicle speed VSP becomes a value obtained by adding the second vehicle speed difference β to the CL2 slip-in vehicle speed Vin, the second switch SW2 outputs a preset damping rate "second intermediate value". That is, a second AND circuit AND2 satisfies the AND condition and is turned ON, when the value obtained by subtracting the CL2 slip-in vehicle speed Vin from the actual vehicle speed VSPT becomes less than the second vehicle speed difference β. Then, the second switch SW2 outputs "second intermediate value" when the second AND circuit AND2 is turned ON. When the second AND circuit AND2 is turned OFF, and there is an input of the first intermediate value from the third switch SW3, the second switch SW2 outputs the first intermediate value.

When the vehicle speed VSP becomes a value obtained by adding the third vehicle speed difference α to the CL2 slip-in vehicle speed Vin, the third switch SW3 outputs a preset damping rate "first intermediate value." That is, a third AND circuit AND3 satisfies the AND condition and is turned ON, when the value obtained by subtracting the CL2 slip-in vehicle speed Vin from the actual vehicle speed VSPT becomes less than the third vehicle speed difference α.

A slip-in switch SLPSW outputs an EV slip-in vehicle speed, when traveling in the EV mode, and outputs an HEV slip-in vehicle speed toward a subtractor, when traveling in the HEV mode. The subtractor 801 outputs a value obtained by subtracting the CL2 slip-in vehicle speed Vin from the actual vehicle speed VSPT.

With the backlash reducing damping rate setting circuit configured as described above, the damping rate is set to a "first intermediate value" which is smaller than the first damping rate, while the vehicle speed VSP is between a value obtained by adding the third vehicle speed difference α, and a value obtained by adding the second vehicle speed difference β, respectively to the CL2 slip-in vehicle speed Vin. In addition, the damping rate is set to a "second intermediate value", which is smaller than the "first intermediate value", while the vehicle speed VSP is between a value obtained by adding the second vehicle speed difference β, and a value obtained by adding the first vehicle speed difference γ, respectively to the CL2 slip-in vehicle speed Vin.

Additionally, the damping rate is set to "0," which is smaller than the "second intermediate value", during a gear backlash reduction process, when the vehicle speed VSP is between the CL2 slip-in vehicle speed Vin, and a value obtained by adding the first vehicle speed difference γ to the CL2 slip-in vehicle speed Vin. That is, the attenuation of the inverse filter is invalidated. While the damping rate during the backlash reduction process was described above as "0", it is sufficient if the damping rate is smaller than the "second intermediate value" during the backlash reduction process.

During Cooperative Regenerative Braking and During Gear Backlash Reduction

Next, the operation during cooperative regenerative braking and during the gear backlash reduction process will be described based on the damping rate characteristic diagram and the drive torque corresponding to the vehicle speed in FIG. 11. When the driver carries out a brake operation, the braking force corresponding to the operation of the brake pedal 51a is distributed to a braking force by hydraulic pressure that is formed in the brake fluid pressure control unit 52, and a braking force by regeneration of the motor MG (cooperative regenerative torque). In addition, when the vehicle speed VSP decreases by a certain extent, the cooperative regenerative torque of the motor MG is reduced.

FIG. 11 illustrates the changes in the cooperative regenerative torque (target motor torque), when the vehicle speed VSP decreases while traveling in the HEV mode. As described above, if the vehicle speed VSP decreases during cooperative regenerative braking control, the engine rotational speed is kept at the idling rotational speed, after gradually reducing the cooperative regenerative torque; therefore, the target driving torque is switched from negative to positive, and the second clutch CL2 is slipped. In addition, when switching the target driving torque from negative to positive, the gear backlash reduction process is carried out, the target driving torque is limited, the gear backlash component of the drive transmission system is reduced, and generation of shock caused by acceleration of the motor rotation is suppressed.

Upon carrying out such an operation, the problem in the comparative example, in which a constant first damping rate is used as the damping rate of the inverse filter 31a in all speed ranges, will be described first. When a constant first damping rate is used as the damping rate of the inverse filter 31a in all speed ranges in this manner, the responsiveness in the gear backlash reduction process is also reduced. Consequently, in the comparative example, it is necessary to set the vehicle speed Vkai high when starting the gear backlash reduction process, relative to the CL2 slip-in vehicle speed Vin, and the speed range Hgat1 between this vehicle speed Vkai1 and the CL2 slip-in vehicle speed Vin becomes wider.

In addition, since the cooperative regenerative torque is reduced to "0" at the start of the gear backlash reduction process, the vehicle speed Vtei1 when starting the reduction of the cooperative regenerative torque is also set high, which limits the cooperative regeneration region. Therefore, the kinetic energy recovery performance is suppressed.

In contrast, in the first embodiment, the damping rate of the inverse filter 31a is made variable, and the damping rate during the gear backlash reduction process is set to "0." Accordingly, during the gear backlash reduction process, the target driving torque can be controlled with a high response, and the time (Hgat2) required for the gear backlash reduction process can be shortened.

As a result, the vehicle speed Vkai2 (=Vα) when starting the gear backlash reduction process, with respect to the CL2 slip-in vehicle speed Vin, can be set lower than in the comparative example, and the vehicle speed Vtei2 when starting the reduction of the cooperative regenerative torque can also be set lower than in the comparative example (Vtei1). Therefore, the cooperative regeneration region, in which cooperative regenerative braking control can be executed, is expanded, the kinetic energy recovery performance is improved, and fuel consumption is improved.

In the operation example of FIG. 11, when coasting, in which the driver is not carrying out a braking operation or an operation of the accelerator pedal (not shown), the damping rate is set according to the above-described target driving torque change amount and the target motor torque change amount, by the process of Steps S05-S07.

Effects of the First Embodiment

The effects of the damping control device for a hybrid vehicle according to the first embodiment are listed below.

1) The damping control device for a hybrid vehicle according to the first embodiment, is a damping control device for a hybrid vehicle having a drive source including an engine Eng and a motor MG; a motor torque calculating means 30 for calculating a target motor torque of a motor MG, provided with a feed forward control unit 31 that attenuates vibration caused by a disturbance that is assumed in advance, and a feedback control unit 32 that attenuates vibration caused by an actual disturbance; and a target driving torque calculation unit 100 that calculates a target driving torque by the engine Eng and the motor MG, the damping control device comprising: a target driving torque change amount calculation unit 901 that calculates a target driving torque change amount, which is a time-differential of a target driving torque; a target motor torque change amount calculation unit 902 that calculates a target motor torque change amount, which is a time-differential of a target motor torque; and a damping rate variation unit 40 that sets a damping rate of a feed forward control unit 31 to a first damping rate when the target driving torque change amount and the target motor torque change amount both are positive or negative, and to a second damping rate, which is smaller than the first damping rate, when the target driving torque change amount and the target motor torque change amount have opposite positivity or negativity. Therefore, when the target driving torque change amount and the target motor torque change amount have opposite positivity or negativity, it is possible to improve the responsiveness of the motor torque by reducing the damping rate. Therefore, since the divergence between the actual driving torque and target driving torque of a vehicle is reduced, it is possible to suppress discomfort imparted to the driver.

2) The damping control device for a hybrid vehicle according to the first embodiment, further comprising: a target driving torque increase/decrease determination section 501 that determines whether or not the target driving torque change amount is equal to, or greater than, an increase determination threshold as a positive first driving torque change amount; and a target motor torque increase/decrease determination section 601 that determines whether or not the target motor torque change amount is less than a decrease determination threshold as a negative second motor torque change amount, which is smaller than the increase determination threshold as the positive first motor torque change amount; wherein when the target driving torque change amount is equal to or greater than the increase determination threshold and the target motor torque change amount is less than the decrease determination threshold, the damping rate variation unit 40 sets the damping rate to the second damping rate. During traveling, the target driving torque and the target motor torque change slightly according to the traveling state, and the positive/negative state of the change amount also changes slightly. Therefore, by setting thresholds for determining an increase or decrease of the respective torque change amounts, it becomes possible to accurately determine a situation in which the positive/negative states of the two torque change amounts are different, in which a decrease in the damping rate is required.

3) The damping control device for a hybrid vehicle according to the first embodiment, further comprising: a target driving torque increase/decrease determination section 501 that determines whether or not the target driving torque change amount is less than a decrease determination threshold as a negative second driving torque change amount, which is less than the positive increase determination threshold; and a target motor torque increase/decrease determination section 601 that determines whether or not the target motor torque change amount is equal to or greater than the increase determination threshold as a positive first motor torque change amount; wherein when the target driving torque change amount is less than the decrease determination threshold and the target motor torque change amount is equal to or greater than the increase determination threshold, the damping rate variation unit 40 sets the damping rate to the second damping rate. During traveling, the target driving torque and the target motor torque change slightly according to the traveling state, and the positive/negative state of the change amount also changes slightly. Therefore, by setting thresholds for determining an increase or decrease of the respective torque change amounts, it becomes possible to accurately determine a situation in which the positive/negative states of the two torque change amounts are different, in which a decrease in the damping rate is required.

4) The damping control device for a hybrid vehicle according to the first embodiment, further comprising: a target driving torque change amount stable range determination section 502 that determines whether or not the target driving torque change amount is within a driving torque change amount stable range, which is less than the increase determination threshold as a positive first driving torque change amount, and equal to, or greater than, a negative second driving torque change amount decrease determination threshold; and a target motor torque change amount stable range determination section 602 that determines whether or not the target motor torque change amount is within a target motor torque change amount stable range, which is less than the increase determination threshold as a positive first motor torque change amount, and equal to or greater than the decrease determination threshold as a negative second motor torque change amount; wherein the damping rate variation unit 40 sets the damping rate to a third damping rate (second intermediate value) between the first damping rate and the second damping rate, when the target driving torque change amount is within a driving torque change amount stable range, and the target motor torque change amount is outside of a target motor torque change amount stable range. When the target driving torque change amount is stable between an increase determination and a decrease determination, and the target motor torque change amount is increasing or decreasing, the damping rate will change smoothly, by setting intermediate damping rates in this manner. Accordingly, it is possible to suppress imparting discomfort to the driver caused by a change in the damping rate, and to suppress discomfort imparted to the driver by improving the responsiveness of the motor torque, even in situations in which the motor torque fluctuates.

5) The damping control device for a hybrid vehicle according to the first embodiment, further comprising: a target driving torque change amount stable range determination section 502 that determines whether or not the target driving torque change amount is within a driving torque change amount stable range, which is less than the increase determination threshold as a positive first driving torque change amount, and equal to or greater than the decrease determination threshold as a negative second driving torque change amount; and a target motor torque change amount range determination section 602 that determines whether or not the target motor torque change amount is within a target motor torque change amount stable range, which is less than the increase determination threshold as a positive first motor torque change amount, and equal to or greater than the decrease determination threshold as a negative second motor torque change amount; wherein the damping rate variation unit 40 sets the damping rate to a third damping rate (second intermediate value) between the first damping rate and the second damping rate, when the target driving torque change amount is outside of a driving torque change amount stable range, and the target motor torque change amount is within the target motor torque change amount stable range. When the target motor torque change amount is stable between an increase determination and a decrease determination, and the target driving torque change amount is increasing or decreasing, the damping rate will change smoothly, by setting intermediate damping rates in this manner. Accordingly, it is possible to suppress imparting discomfort to the driver caused by a change in the damping rate, and to suppress discomfort imparted to the driver by improving the responsiveness of the motor torque, even in situations in which the driving torque fluctuates.

6) The damping control device for a hybrid vehicle according to the first embodiment, further comprising: an integrated controller 10 as a cooperative regenerative braking means that carries out cooperative regenerative braking, in which a braking force of the vehicle is distributed to a hydraulic braking force and a regenerative braking force, wherein the damping rate variation unit 40 sets the damping rate, in a case where cooperative regenerative braking is being executed, to a first damping rate, which is larger compared to when cooperative regenerative braking is not being executed. During cooperative regenerative braking, the driver has heightened sensitivity to vibration caused by disturbance. Therefore, by setting the damping rate high, it is possible to effectively suppress vibration caused by disturbance and to suppress discomfort imparted to the driver caused by vibration.

7) The damping control device for a hybrid vehicle according to the first embodiment, wherein the integrated controller 10 comprises a gear backlash reduction control means that suppresses vibration that occurs on a drive shaft from a drive source to the wheels, when the target driving torque fluctuates from positive to negative, or from negative to positive; and the damping rate variation unit 40 sets the damping rate to a damping rate smaller than the first damping rate (S02), during an operation of the gear backlash reduction control means. Therefore, it becomes possible to enhance the control response of the gear backlash reduction torque, and to perform the gear backlash reduction in a short period of time. It is thereby possible to expand the cooperative regenerative braking region and to enhance the energy recovery performance by the regeneration, particularly at the time of gear backlash reduction after cooperative regenerative braking.

8) The damping control device for a hybrid vehicle according to the first embodiment, wherein the damping rate variation unit 40 gradually reduces the damping rate in advance, from the first damping rate to the first intermediate value and the second intermediate value, at the time of a gear backlash reduction, and sets the damping rate to the second damping rate (0) during the gear backlash reduction. Therefore, by setting the second damping rate (0) during gear backlash reduction, it is possible to reliably increase the responsiveness during the gear backlash reduction process, and to reliably shorten the time required for the gear backlash reduction process. In addition, by gradually reducing the damping rate in advance for the gear backlash reduction, it is possible to suppress a change in the motor torque caused by a sudden change in the damping rate, to thereby suppress discomfort imparted to the driver.

The damping control device for a hybrid vehicle of the present invention was described above based on the embodiment, but specific configurations thereof are not limited to this embodiment, and various modifications and additions to the design can be made without departing from the scope of the invention according to each claim.

For example, in the embodiment, a motor-generator that is capable of powering and regeneration was shown as the motor, but no limitation is imposed thereby, and a motor that is only capable of powering may be used as well. In addition, in the embodiment, examples were shown in which a continuously variable transmission was used as the transmission; however, the transmission is not limited to a continuously variable transmission, and other manual or automatic transmission may be used as well. Additionally, in the embodiment, an example was shown in which the damping rate is set to 0 as the second damping rate, but no limitation is imposed thereby, and the damping rate may be any value lower than the first damping rate; for example, it is possible to use a value corresponding to the first intermediate value or the second intermediate value shown in the embodiment.

The invention claimed is:

1. A damping control device for a hybrid vehicle having a drive source including an engine and a motor;
    a target driving torque calculation unit that calculates a target driving torque by the engine and the motor based on an accelerator position opening amount and a vehicle speed;
    a motor torque calculation unit that calculates a target motor torque of the motor, that corrects the target motor torque and calculates a final target motor torque by a feed forward control that inputs the target motor torque of the motor obtained from the target driving torque, then attenuates and outputs the target motor torque, and a feedback control that inputs the motor rotational speed, and adds a torque for attenuating a vibration component caused by an actual disturbance to the output by the feed forward control,
    the damping control device comprising:
    a target driving torque change amount calculation unit that calculates a target driving torque change amount, which is a time-differential of a target driving torque;
    a target motor torque change amount calculation unit that calculates a target motor torque change amount, which is a time-differential of a target motor torque; and
    a damping rate variation unit that sets a damping rate by the feed forward control to a first damping rate when the target driving torque change amount and the target motor torque change amount both are positive or negative, and to a second damping rate, which is smaller than the first damping rate, when the target driving torque change amount and the target motor torque change amount have opposite positivity or negativity.

2. The damping control device according to claim 1, further comprising:
    a target driving torque determination unit that determines whether or not the target driving torque change amount is equal to, or greater than, a positive first driving torque change amount; and
    a target motor torque determination unit that determines whether or not the target motor torque change amount is less than a negative second motor torque change amount, which is less than the positive first motor torque change amount;
    when the target driving torque change amount is equal to, or greater than, the first driving torque change amount, and the target motor torque change amount is less than the second motor torque change amount, the damping rate variation unit being configured to set the damping rate to the second damping rate.

3. The damping control device according to claim 1, further comprising:
a target driving torque determination unit that determines whether or not the target driving torque change amount is less than a negative second driving torque change amount, which is less than the positive first driving torque change amount; and
a target motor torque determination unit that determines whether or not the target motor torque change amount is equal to, or greater than, the positive first motor torque change amount;
when the target driving torque change amount is less than the second driving torque change amount, and the target motor torque change amount is equal to or greater than the first motor torque change amount, the damping rate variation unit being configured to set the damping rate to the second damping rate.

4. The damping control device according to claim 1, further comprising:
a driving torque change amount stable range determination unit that determines whether or not the target driving torque change amount is within a driving torque change amount stable range, which is less than a positive first driving torque change amount, and equal to, or greater than, a negative second driving torque change amount; and
a motor torque change amount range determination unit that determines whether or not the target motor torque change amount is within a motor torque change amount stable range, which is less than a positive first motor torque change amount, and equal to, or greater than, a negative second motor torque change amount;
wherein
the damping rate variation unit being configured to set the damping rate to a third damping rate between the first damping rate and the second damping rate, when the target driving torque change amount is within a driving torque change amount stable range, and the target motor torque change amount is outside of the motor torque change amount stable range.

5. The damping control device according to claim 1, further comprising:
a driving torque change amount stable range determination unit that determines whether or not the target driving torque change amount is within a driving torque change amount stable range, which is less than a positive first driving torque change amount, and equal to, or greater than, a negative second driving torque change amount; and
a motor torque change amount range determination unit that determines whether or not the target motor torque change amount is within a motor torque change amount stable range, which is less than a positive first motor torque change amount, and equal to, or greater than, a negative second motor torque change amount;
the damping rate variation unit being configured to set the damping rate to a third damping rate between the first damping rate and the second damping rate, when the target driving torque change amount is outside of the driving torque change amount stable range, and the target motor torque change amount is within the motor torque change amount stable range.

6. The damping control device according to claim 1, further comprising:
a cooperative regenerative braking unit that carries out cooperative regenerative braking, in which a braking force of the vehicle is distributed to a hydraulic braking force and a regenerative braking force,
the damping rate variation unit being configured to set the damping rate, in a case where the cooperative regenerative braking is being executed, larger compared to when the cooperative regenerative braking is not being executed.

7. The damping control device according to claim 1, wherein
a gear backlash reduction control unit is provided, which suppresses vibration that occurs on a drive shaft from a drive source to wheels when the target driving torque fluctuates from positive to negative, or from negative to positive; and
the damping rate variation unit being configured to set the damping rate to a damping rate that is smaller than the first damping rate, during an operation of the gear backlash reduction control unit.

* * * * *